United States Patent
Kawai et al.

(10) Patent No.: US 10,789,839 B2
(45) Date of Patent: Sep. 29, 2020

(54) OBJECT DETECTION APPARATUS, AND STORAGE MEDIUM

(71) Applicant: Panasonic Intellectual Property Management Co., Ltd., Osaka (JP)

(72) Inventors: Yoshinao Kawai, Kanagawa (JP); Yasumichi Takai, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 108 days.

(21) Appl. No.: 15/597,745

(22) Filed: May 17, 2017

(65) Prior Publication Data
US 2017/0345300 A1    Nov. 30, 2017

(30) Foreign Application Priority Data
May 25, 2016 (JP) ................. 2016-104305

(51) Int. Cl.
*G08G 1/0967* (2006.01)
*G08G 1/01* (2006.01)
(Continued)

(52) U.S. Cl.
CPC ... *G08G 1/096725* (2013.01); *B60W 30/0956* (2013.01); *G01S 13/66* (2013.01); *G01S 13/931* (2013.01); *G08G 1/0112* (2013.01); *G08G 1/0116* (2013.01); *G08G 1/0133* (2013.01); *G08G 1/04* (2013.01); *G08G 1/096894* (2013.01); *G08G 1/166* (2013.01); *G01S 2013/93271* (2020.01)

(58) Field of Classification Search
CPC ............. G08G 1/096725; G08G 1/166; G08G 1/0112; G08G 1/0133; G08G 1/0116;
(Continued)

(56) References Cited

U.S. PATENT DOCUMENTS

| | | |
|---|---|---|
| 2002/0030611 A1 | 3/2002 | Nuesser et al. |
| 2012/0065841 A1 | 3/2012 | Nagata et al. |

(Continued)

FOREIGN PATENT DOCUMENTS

| | | |
|---|---|---|
| EP | 2 437 231 A1 | 4/2012 |
| EP | 2 549 456 A1 | 1/2013 |

(Continued)

OTHER PUBLICATIONS

Partial European Search Report, dated Sep. 28, 2017, for corresponding European Application No. 17171683.0-1803, 14 pages.

(Continued)

*Primary Examiner* — Nga X Nguyen
(74) *Attorney, Agent, or Firm* — Seed IP Law Group LLP (57) ABSTRACT

An object detection apparatus includes an input port that receives information on a plurality of objects in surroundings of a vehicle and information on a traffic environment of the vehicle, the plurality of objects being detected by a sensor installed on the vehicle, a controller that determines, based on the information on the plurality of objects and the information on the traffic environment, priority for each of the plurality of objects and determines first information based on the priority in a case where the total amount of information on the plurality of objects is greater than a determined value, the first information being information on part of the plurality of objects, and an output port that outputs the first information to an in-vehicle apparatus that controls the vehicle.

14 Claims, 7 Drawing Sheets

(51) Int. Cl.
*G08G 1/04* (2006.01)
*G08G 1/0968* (2006.01)
*G01S 13/66* (2006.01)
*G01S 13/93* (2020.01)
*G08G 1/16* (2006.01)
*B60W 30/095* (2012.01)
*G01S 13/931* (2020.01)

(58) Field of Classification Search
CPC .... G08G 1/04; G08G 1/096894; G08G 1/165; G08G 1/167; B60W 30/0956; B60W 50/06; B60W 2050/065; B60W 2540/20; B60W 2520/10; B60W 2420/52; G01S 13/66; G01S 13/931; G01S 2013/9375; G01S 13/87; G01S 2013/93274; G01S 2013/93272; G01S 2013/93271; G01S 2013/9322; G01S 2013/9315; G01S 2013/932; G01S 13/00
See application file for complete search history.

(56) References Cited

U.S. PATENT DOCUMENTS

| | | | |
|---|---|---|---|
| 2012/0093357 A1* | 4/2012 | Seder | B60W 30/095 382/103 |
| 2012/0310517 A1 | 12/2012 | van den Oever | |
| 2013/0345954 A1* | 12/2013 | Tashiro | G08G 1/0112 701/117 |
| 2014/0002276 A1 | 1/2014 | Iyer et al. | |
| 2016/0232788 A1* | 8/2016 | Byun | G08G 1/0112 |
| 2016/0249180 A1* | 8/2016 | Li | G08G 1/096716 |
| 2018/0134207 A1* | 5/2018 | Kentley-Klay | B60W 10/04 |
| 2018/0151066 A1* | 5/2018 | Oba | G08G 1/096725 |

FOREIGN PATENT DOCUMENTS

| | | | |
|---|---|---|---|
| JP | 2004-077281 A | | 3/2004 |
| JP | 2007-232412 | * | 9/2007 |
| JP | 2007-232412 A | | 9/2007 |
| JP | 2007-251257 A | | 9/2007 |
| JP | 2012-014257 A | | 1/2012 |
| WO | 2010/140239 A1 | | 12/2010 |

OTHER PUBLICATIONS

Extended European Search Report, dated Jan. 30, 2018, for the related European Patent Application No. 17171683.0-1203 / 3249630, 13 pages.

Summons to attend oral proceedings pursuant to Rule 115(1) EPC dated Jul. 26, 2019 for the related European Patent Application No. 17171683.0.

* cited by examiner

OBJECT DETECTION APPARATUS, AND STORAGE MEDIUM

BACKGROUND

1. Technical Field

The present disclosure relates to an object detection apparatus that outputs, to an in-vehicle apparatus, information on an object detected by a sensor installed on a vehicle, and a storage medium.

2. Description of the Related Art

A type of an object detection apparatus is disclosed, for example, in Japanese Unexamined Patent Application Publication 2007-232412. This object detection apparatus includes a detection unit that detects an object using a radar and a selection unit. The detection unit detects a high-threshold object with a reflection intensity higher than a first threshold value and a low-threshold object with a reflection intensity lower than the first threshold value and higher than a second threshold value. The selection unit performs selection such that in a case where the sum of the number of candidates for the high-threshold objects detected by the detection unit and the number of candidates for the low-threshold objects is greater than a preset maximum allowable number of objects capable of being output as a detection result, the selection unit selects, as the detection result, high-threshold objects and low-threshold objects such that a higher priority is given to the candidates for high-threshold objects.

SUMMARY

In the known object detection apparatus, the priority of objects to be detected is determined based on the reflection intensity. However, objects to be detected for a vehicle may be different depending on a traffic environment.

One non-limiting and exemplary embodiment facilitates providing an object detection apparatus, and a storage medium capable of outputting information on an object depending on a traffic environment.

In one general aspect, the techniques disclosed here feature an object detection apparatus including an input port that receives information on a plurality of objects in surroundings of a vehicle and information on a traffic environment of the vehicle, the plurality of objects being detected by a sensor installed on the vehicle, a controller that determines, based on the information on the plurality of objects and the information on the traffic environment, priority for each of the plurality of objects and determines first information based on the priority in a case where the total amount of information on the plurality of objects is greater than a determined value, the first information being information on part of the plurality of objects, and an output port that outputs the first information to an in-vehicle apparatus that controls the vehicle.

According to the present disclosure, it is possible to facilitate providing an object detection apparatus and a storage medium, capable of outputting information on an object depending on a traffic environment.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Referring to drawings, the present disclosure is described in further detail below with reference to embodiments of object detection apparatuses 1, 1A, and 1B, programs 137, 137A, and 137B, and a storage medium storing the program 137, 137A, or 137B.

1. Embodiments

First, an object detection apparatus 1 according to an embodiment of the present disclosure is described.

1-1. Configuration of Object Detection Apparatus 1 and Peripheral Configuration In FIG. 1, a vehicle V includes, as apparatuses installed therein, in addition to the object detection apparatus 1 described above, a sensor 3, a traffic environment transmission apparatus 5, and an in-vehicle apparatus 7. In the present disclosure, it is possible to perform data transmission via a data transmission line 9, using a particular data transmission method, between the object detection apparatus 1 and each of other apparatuses including the sensor 3, the traffic environment transmission apparatus 5, and the in-vehicle apparatus 7. Examples of the data transmission method include Controller Area Network (CAN), Ethernet (registered trademark), etc.

Figure 1:
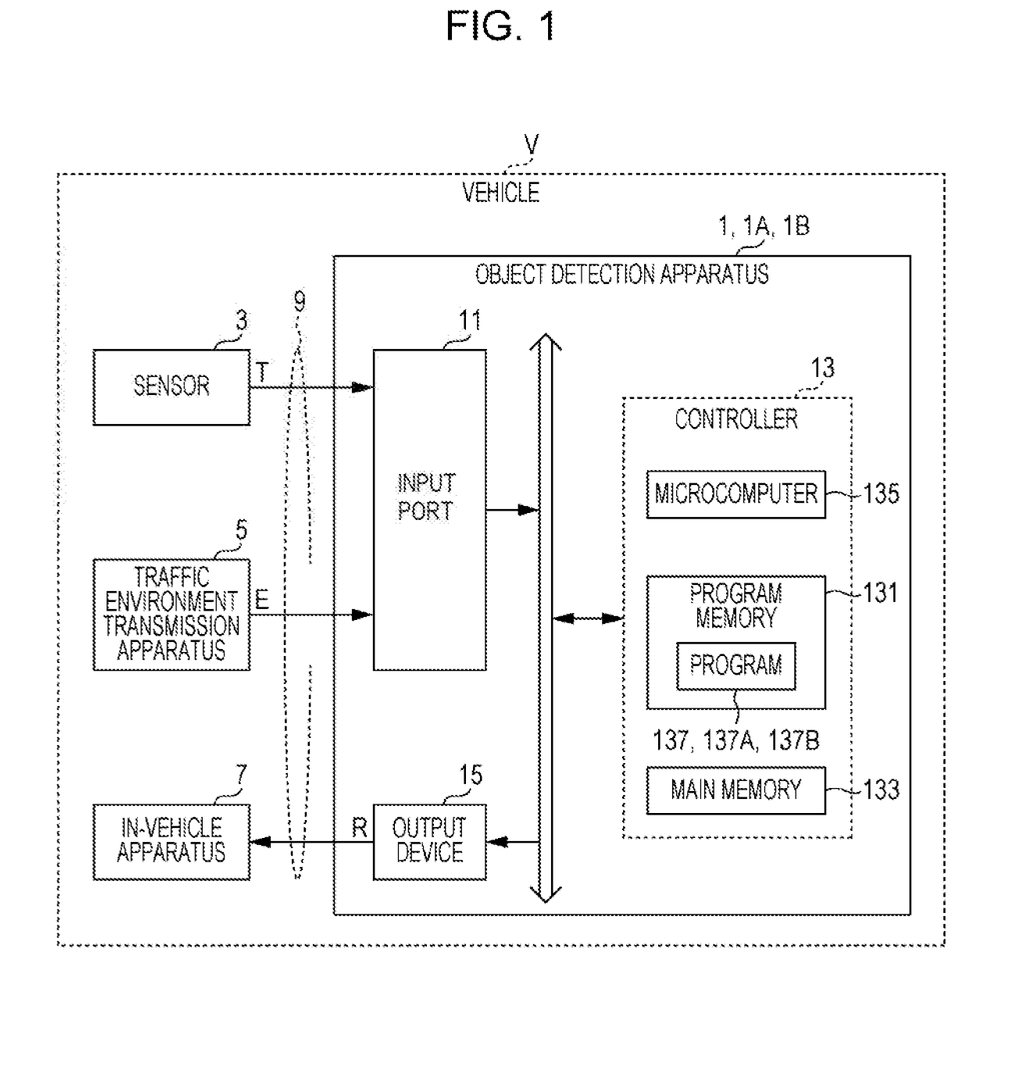
FIG. 1 illustrates a hardware configuration of an object detection apparatus according to the disclosure and a configuration of a peripheral configuration.

First, the sensor 3 and the traffic environment transmission apparatus 5 are described. The sensor 3 is, for example, a millimeter wave radar, and is installed, for example, near the front end of the vehicle V. For example, the sensor 3 periodically transmits a radar signal (for example, a radio wave in a millimeter wave band) within a measurable range (in other words, in a visible range). When the sensor 3 receives, via its receiving antenna, a return signal which is a radar signal output and reflected back from an object (target object), the sensor 3 executes a known target recognition algorithm. As a result, a direction, a distance, a relative speed, a return signal strength, and/or the like of an object (typically a moving object) existing in surroundings of the vehicle V are detected time-sequentially. The sensor 3 time sequentially transmits target information T associated with each object existing in the surroundings of the vehicle V to the object detection apparatus 1 via the data transmission line 9. In the present disclosure, the target information T includes items such as the direction, the distance, the relative speed, and/or the like of the object with reference to the vehicle V (or the sensor 3).

The traffic environment transmission apparatus 5 is, for example, a navigation apparatus. For example, the traffic environment transmission apparatus 5 is capable of identifying a current location of the vehicle V (more specifically, the current position of the sensor 3) and capable of acquiring network data representing a road distribution expressed typically using links and nodes from a local storage device (not illustrated) or a remote server. Each node represents a feature point (an intersection or a bending point) on a road. Each link represents a road between each of nodes. Each link is assigned various kinds of information on a road, such as a road type or the like. Examples of road types include an expressway, a general road, a road close to an intersection, and the like.

The traffic environment transmission apparatus 5 identifies, in response to a request from the object detection apparatus 1, a road on which the vehicle V is currently running, and acquires traffic environment information E including a type of the identified road from network data. The traffic environment transmission apparatus 5 transmits the acquired traffic environment information E to the object detection apparatus 1 via the data transmission line 9.

The object detection apparatus 1 is disposed, for example, in an Electronic Control Unit (ECU), and includes an input port 11, a controller 13, and an output port 15.

The input port 11 is an input interface according to the data transmission method described above. The input port 11 receives target information T from the sensor 3 and traffic environment information E from the traffic environment transmission apparatus 5. Furthermore, under the control of the controller 13, the input port 11 transfers the received target information T and the traffic environment information E to a main memory 133 of the controller 13.

The controller 13 includes, for example, a program memory 131, the main memory 133, and a microcomputer 135.

The program memory 131 is, for example, a non-transitory memory such as EEPROM. In the program memory 131, a program 137 describing a processing procedure (described later with reference to FIG. 3) is stored in advance.

The main memory 133 is, for example, a semiconductor memory such as SRAM.

The microcomputer 135 executes the program 137 using the main memory 133 or the like as a work area. Basically, the microcomputer 135 transmits all received target information T to the in-vehicle apparatus 7 via the data transmission line 9. However, in a case where it is impossible to transmit all received target information T, the microcomputer 135 selects target information with high priority from the received target information T, and transmits the selected target information with high priority to the in-vehicle apparatus 7 via the data transmission line 9.

The output port 15 is an output interface according to the data transmission method, and transmits target information T to the in-vehicle apparatus 7 via the data transmission line 9 each time the target information T to be transmitted is determined by the microcomputer 135.

The in-vehicle apparatus 7 is an apparatus such as a display apparatus, an automatic braking apparatus, or the like installed in the vehicle V, and performs a particular process based on a detection result R received from the output port 15.

1-2. Process Performed by Controller 13

Figure 2:
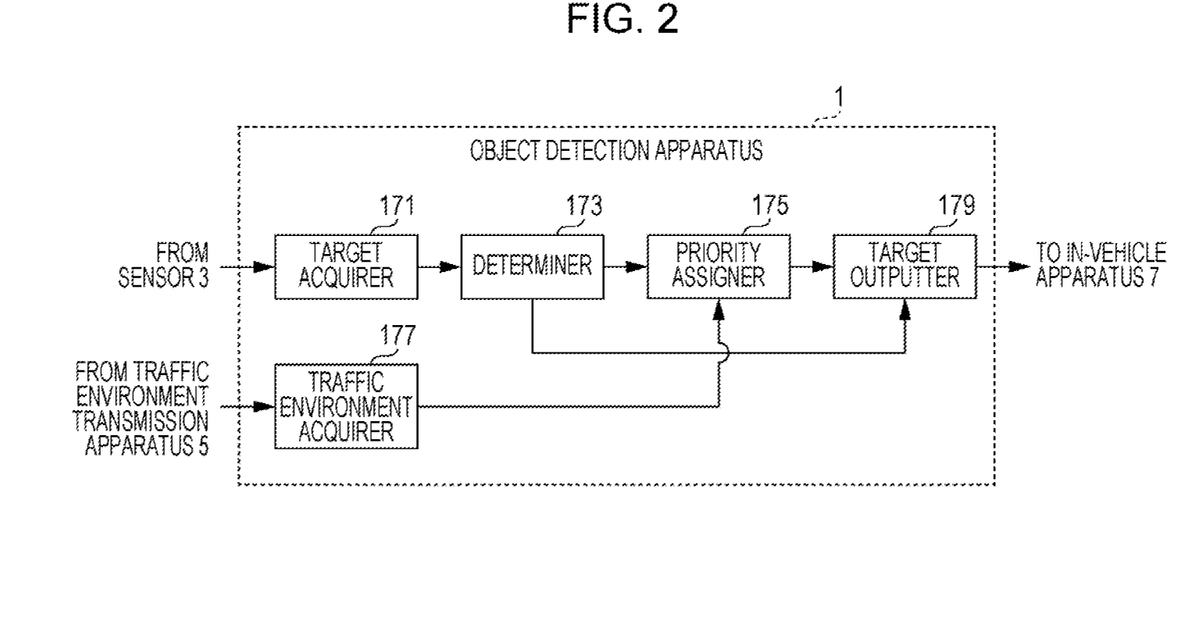
FIG. 2 illustrates functional blocks of an object detection apparatus according to a first embodiment.

In the controller 13, as described above, the microcomputer 135 executes the program 137 thereby functioning as a target acquirer 171, a determiner 173, a priority assigner 175, a traffic environment acquirer 177 and a target outputter 179, as illustrated in FIG. 2. Next, referring to FIG. 1 to FIG. 3, an operation by the object detection apparatus 1 (for example, a processing procedure of the microcomputer 135 defined in the program 137) is described below.

The target information T transmitted time-sequentially from the sensor 3 is received by the input port 11. First, the microcomputer 135 functions as the target acquirer 171 and transfers the received target information T to the main memory 133. As a result, the controller 13 acquires the target information T (step S001 in FIG. 3).

Figure 3:
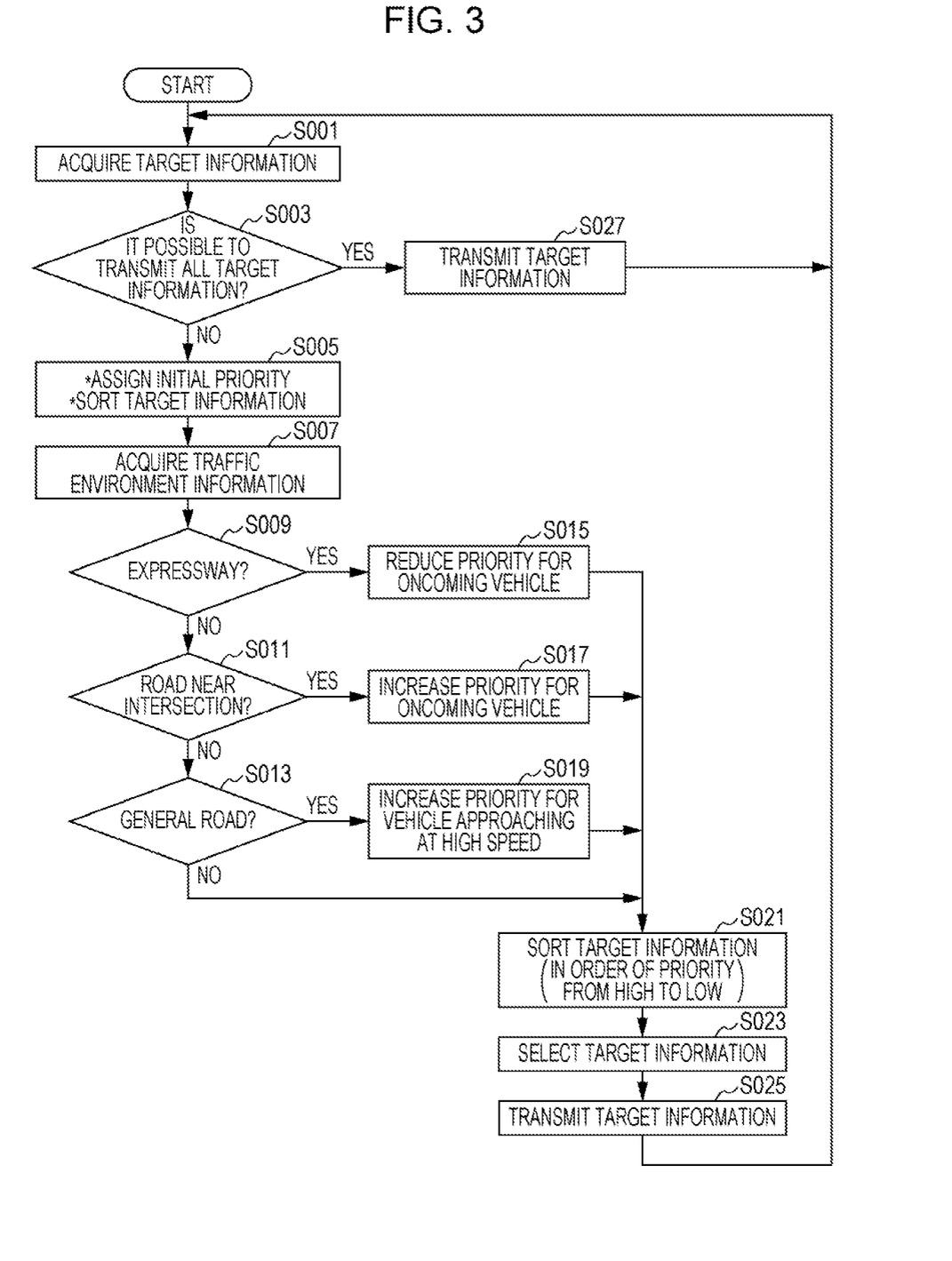
FIG. 3 illustrates a flow of a process performed by the object detection apparatus shown in FIG. 2.

After step S001, the microcomputer 135 functions as the determiner 173, and determines whether it is possible to transmit all target information T acquired in step S001 to the in-vehicle apparatus 7 (step S003). More specifically, the transmission bandwidth usable in the data transmission from the object detection apparatus 1 to the in-vehicle apparatus 7 is limited to a predetermined fixed value. Furthermore, the transmission from the target information T to the in-vehicle apparatus 7 generally needs to be performed in real time. Thus, in step S003, it is determined whether it is possible to transmit all target information T received by the object detection apparatus 1 to the in-vehicle apparatus 7 using a usable transmission bandwidth within a predetermined period of time. In other words, it is determined whether the data output rate (transmission bandwidth) [bits/sec] at the output port 15×output time (predetermine time period) [sec] is larger than the total amount of data [bits] of the acquired target information T.

In a case where it is determined in step S003 (by the determiner 173) that it is possible to transmit all target information T (Yes in step S003), then the microcomputer 135 functions as the target outputter 179 and transmits all target information T acquired in step S001 to the in-vehicle apparatus 7 (step S027). After step S027, the microcomputer 135 returns the process to step S001, in which the microcomputer 135 performs a process shown in FIG. 3 on the target information T that the input port 11 newly receives from the sensor 3 via the data transmission line 9.

On the other hand, in a case where it is determined in step S003 (by the determiner 173) that it is impossible to transmit all target information T (No in step S003), the microcomputer 135 functions as the priority assigner 175 and determines an initial priority for each piece of information included in the whole target information T acquired in step S001 and sorts the pieces of information in the target information T in order of priority from high to low (step S005). In this step S005, for example, the closer the distance between the vehicle V (or the sensor 3) and the object described in a piece of information in the target information T, the higher the priority assigned to the piece in the target information T.

Next, the microcomputer 135 functions as the traffic environment acquirer 177 and acquires traffic environment information E from the traffic environment transmission apparatus 5. In the present disclosure, the traffic environment information E represents a traffic environment in the surroundings of the vehicle V, and more specifically the traffic environment information E includes information indicating a type of a road on which the vehicle V is currently running (hereinafter referred to as a road type). Examples of road types include an expressway, a general road, a road close to intersection, and the like. The traffic environment information E is received by the input port 11. The microcomputer 135 transfers the received traffic environment information E to the main memory 133. As a result, the controller 13 acquires the traffic environment information E (step S007).

Next, the microcomputer 135 functions as the priority assigner 175 and determines whether the road type described in the traffic environment information E is the expressway, the road close to intersection, or the general road (steps S009, S011, and S013).

In a case where the road type is the expressway, the microcomputer 135 advances the processing flow from step S009 to step S015, in which the microcomputer 135 changes the priority of pieces of information included in the target information T currently stored in the main memory 133 such that the priority of a piece of information associated with an oncoming vehicle is reduced by a first predetermined value (step S015). This process is performed because expressways each have a center divider and thus oncoming vehicles do not have significant influences on running or driving of the vehicle V. The determination as to whether the target information T indicates an oncoming vehicle or not may be performed based a relative speed and a direction described in the target information T. The first predetermined value may be properly determined when the object detection apparatus 1 is designed or developed. In a case where the road type is not the expressway, the microcomputer 135 advances the processing flow from step S009 to step S011.

In a case where the road type is the road close to intersection, the microcomputer 135 advances the processing flow from step S011 to step S017, in which the microcomputer 135 changes the priority of pieces of information included in the target information T currently stored in the main memory 133 such that the priority of a piece of information associated with an oncoming vehicle is increased by a second predetermined value (step S017). This process is performed because, on the road close to intersection, oncoming vehicles have significant influences on running or driving of the vehicle V. More specifically, when the vehicle V runs straight or makes a right turn at an intersection, the running or driving of the vehicle V may be influenced by an oncoming vehicle running straight or making a right turn. The determination as to whether a piece of information in the target information T indicates an oncoming vehicle or not may be performed based a relative speed and a direction described in the target information T. The second predetermined value may be properly determined when the object detection apparatus 1 is designed or developed. In a case where the road type is not the road close to intersection, the microcomputer 135 advances the processing flow from step S011 to step S013.

In a case where the road type is a general road, the microcomputer 135 advances the processing flow from step S013 to step S019, in which the microcomputer 135 changes the priority of pieces of information included in the target information T currently stored in the main memory 133 such that the priority of a piece of information associated with a vehicle approaching the vehicle V at a high speed is increased by a third predetermined value (step S019). This process is performed because the running and the driving of the vehicle V are influenced by moving objects (mainly vehicles) located near the vehicle V and approaching the vehicle V at a high speed. In the present disclosure, the initial priority for each piece of information in the target information T is determined, in step S005, depending on the distance between the vehicle V and the object, and thus, in step S019, the priority is increased for a vehicle approaching the vehicle V at a high speed. The determination as to whether a piece of information in the target information T indicates a vehicle approaching the vehicle V at a high speed may be performed based a relative speed and a direction described in the target information T. The third predetermined value may be properly determined when the object detection apparatus 1 is designed or developed.

After steps S015, S017, and S019 described above, the microcomputer 135 functions as the target outputter 179 and sorts the pieces of information in the target information T currently stored in the main memory 133 in order of priority from high to low (step S021).

After step S021 or in a case where the answer to step S013 is No, the microcomputer 135 functions as the target outputter 179 and selects, from the target information T currently stored in the main memory 133, pieces of information that the object detection apparatus 1 can output to the in-vehicle apparatus 7 within the predetermined time period described above based on the priority assigned to the pieces of information (step S023).

The microcomputer 135 further functions as the target outputter 179 and sequentially transmits the pieces of information selected in step S023 in the target information T, for example, in order of priority from high to low, to the data transmission line 9 via the output port 15 (step S025). The transmitted pieces of information of the target information T are received by the in-vehicle apparatus 7 via the data transmission line 9. In a case where the in-vehicle apparatus 7 is a display apparatus, an object existing in the surroundings of the vehicle V is displayed based on the received target information T to call attention of a driver of the vehicle V. If the in-vehicle apparatus 7 is an automatic braking apparatus, braking of the vehicle V is controlled, as required, to reduce the speed of the vehicle V or stop the vehicle V based on the received target information T.

After step S025, the microcomputer 135 returns the processing flow to step S001, in which the microcomputer 135 performs a process shown in FIG. 3 on the target information T that the input port 11 newly receives from the sensor 3 via the data transmission line 9.

1-3. Operations and Effects of Object Detection Apparatus 1

In the object detection apparatus 1, as described above, the input port 11 receives, from the sensor 3, the target information T including pieces of information associated with respective objects existing in the surroundings of the vehicle V, and also receives traffic environment information E representing the traffic environment in the surroundings of the vehicle V from the traffic environment transmission apparatus 5. In the controller 13, the target acquirer 171 stores the target information T received via the input port 11 in the main memory 133. The traffic environment acquirer 177 stores the traffic environment information E received via the input port 11 in the main memory 133.

The priority assigner 175 determines the priority for each of a plurality of objects (described in the target information T) based on the target information T and the traffic environment information E taking into account the influence of the current traffic environment on the running of the vehicle V. In a case where the total amount of data of the target information T in the main memory 133 is larger than the predetermined value, the target outputter 179 selects pieces of information from the target information T stored in the main memory 133 according to the priority determined by the priority assigner 175 and transmits the selected pieces of information to the data transmission line 9 toward the in-vehicle apparatus 7. Note that the priority assigner 175 retains the remaining part of the target information T of objects in the main memory 133.

Thus, it is possible to provide the object detection apparatus 1 and the program 137 capable of limiting the target information T on objects to be output depending on the traffic environment. In particular, the object detection apparatus 1 according to the present disclosure limits the target information T output to the data transmission line 9 to pieces of information associated with objects being highly likely to have an influence on the running of the vehicle V in the current traffic environment. This makes it possible to transmit the target information T to the in-vehicle apparatus 7 without missing part of the target information T used in safely driving the vehicle V in the current traffic environment.

Furthermore, in the present object detection apparatus 1, in step S025, pieces of information included in the target information T are transmitted sequentially in order of priority from high to low to the data transmission line 9, and thus it is possible for the in-vehicle apparatus 7 to quickly receive part of the target information T on objects having a possibility of exerting a significant influence on driving the vehicle V. Therefore, the object detection apparatus 1 is capable of having a large contribution to safe driving of the vehicle V.

1-4. Supplement

In the embodiment described above, it is assumed by way of example, for convenience of explanation, that the traffic environment information E includes information on a road type. However, the traffic environment information E is not limited to the information on the road type, but the traffic environment information E may be any information as long as the information has an influence on the running of the vehicle V or the priority of objects. For example, the traffic environment information E may be information representing a road width, a line shape, a slope, a crossing cant, paving of road, a pedestrian-vehicle separation, or a center division, or a combination of two or more of these items. The running of the vehicle V and/or the priority of objects are basically dependent on the road characteristics such as those described above, but are also influenced by presence/absence of buildings in the surroundings, weather conditions, or the like. In view of this fact, the traffic environment information E may include information about buildings close to a road on which the vehicle V is currently running, and/or information about a current weather condition.

FIG. 3 also illustrates a processing procedure performed in a case where the traffic environment information E includes information indicating a road type such as an expressway, a road close to intersection, or a general road. Note that the processing procedure in FIG. 3 may be properly defined depending on what kind of information is included in the traffic environment information E.

In the embodiment described above, in step S005, the smaller the distance between the vehicle V and an object, the higher the priority assigned to the object. However, the initial priority may be assigned based on another criterion. For example, the higher the running speed of the vehicle V and an object, the higher the priority assigned to the object.

In the embodiment described above, it is assumed by way of example that the traffic environment transmission apparatus 5 is a navigation apparatus. However, the traffic environment transmission apparatus 5 is not limited to the navigation apparatus, but the traffic environment transmission apparatus 5 may be an in-vehicle apparatus capable of performing a road-to-vehicle communication with an apparatus installed on a side of a road on which the vehicle V is running and acquiring traffic environment information E such as that described above. The sensor 3 may also be capable of acquiring part of the traffic environment information E, and thus the traffic environment transmission apparatus 5 may be the sensor 3.

In the embodiment described above, it is assumed by way of example that the sensor 3 is a millimeter wave radar. However, the sensor 3 is not limited to the millimeter wave radar but the sensor 3 may be, for example, a laser radar, a camera, or the like. The sensor 3 may be a combination of two or more of the millimeter wave radar, the laser radar, and the camera.

In the embodiment described above, in view of the transmission bandwidth of the data transmission line 9, the determination in step S003 as to whether the target information T can be transmitted or not is performed by determining whether the data output rate×the output time is larger than the total amount of data of the target information T. However, the method of determining whether all target information T can be transmitted is not limited to the example described above. For example, the determination may be performed based on the viewability of the display apparatus employed as the in-vehicle apparatus 7. In this case, when it is determined in step S003 that the total number of objects described in the target information T is larger than a predetermined value, steps S005 to S025 may be performed. By performing the process in this manner, it becomes possible to limit the number of objects displayed at the same time on the display apparatus, which makes it possible for a driver to easily recognize a plurality of objects existing in the surroundings of the vehicle V.

In the embodiment described above, it is assumed by way of example that the program 137 is stored in the program memory 131. However, the storage in which the program 137 is stored is not limited to the program memory 131. For example, the program 137 may be stored in a computer-readable storage medium (for example, a DVD or the like). Alternatively, the program 137 may be stored in a server apparatus, and the program 137 may be downloaded to various terminal apparatuses (for example, a desktop personal computer, a smartphone, a tablet terminal, or the like). This also holds for programs 137A and 137B described later.

2. First Modification

Next, a first modification of the object detection apparatus 1 is described below.

2-1. Configuration and Process According to First Modification (Object Detection Apparatus 1A)

First, an object detection apparatus 1A according to the first modification of the embodiment is described. In FIG. 1, the object detection apparatus 1A is different from the object detection apparatus 1 in that not the program 137 but a program 137A is stored in the program memory 131. In the object detection apparatus 1A, similar elements to those in the object detection apparatus 1 are denoted by similar reference symbols, and a further description thereof is omitted.

In the control unit 13, the microcomputer 135 executes the program 137A thereby functioning as a target tracker 191 in addition to the functional blocks 171 to 179 described above, as shown in FIG. 4. Next, referring to FIG. 5, a processing procedure defined in the program 137A and performed by the microcomputer 135 is described in detail below. The processing flow shown in FIG. 5 is different from that shown in FIG. 3 in that the processing flow additionally includes steps S101 and S102. In FIG. 5, similar steps to those in FIG. 3 are denoted by similar step numbers, and a further description thereof is omitted or given in a simplified manner.

After step S001, the microcomputer 135 performs S003. In a case where it is determined in S003 that it is difficult to transmit all target information T (No in S003), the microcomputer 135 functions as the target tracker 191 and performs a target tracking process in step S101. In the target tracking process, the target tracker 191 tracks, on a time axis, the same object described in time-sequential target information T using current and past (for example, previous) target information T. By tracking the same object in the time-sequential target information T, it becomes possible to enhance the reliability of the target information T regarding the object. In other words, it is possible to achieve a higher possibility that the object of interest actually exists in the surroundings of the vehicle V. Furthermore, the target tracker 191 transfers the information representing the existence probability, the number of times the tracking was successful, and the information indicating the level of confidence of the target information T (hereinafter referred to simply as confidence level) based on the result of the tracking process to the priority assigner 175. Thus the process in step S101 is completed.

In the first modification, after step S101 is completed, the microcomputer 135 performs steps S005 to S019 described above. Thereafter, the microcomputer 135 functions as the priority assigner 175 and changes the priority for the corresponding target information T based on the confidence level of each object received in the step S101 (step S102). In step S102, for example, the priority for the target information T with a confidence level higher than a reference value is increased by a fourth predetermined value, and the priority for the target information T with a confidence level equal to or lower than a reference value is reduced by a fifth predetermined value. The fourth predetermined value and the fifth predetermined value may be set in a similar manner for the predetermined values described above. Thereafter, the microcomputer 135 performs steps S021 to S027 described above.

2-2. Operations and Effects of Object Detection Apparatus 1A

According to the first modification, it is possible to transmit target information T, which is necessary in safely driving in the current traffic environment, to the in-vehicle apparatus 7 without missing target information T associated with an object highly likely to actually exist.

2-3. Supplement on First Modification

In the first modification, step S101 is performed immediately after step S003. However, there is no restriction on the timing of performing step S101 as long as step S101 is performed after step S001 and before step S102.

3. Second Modification

Next, a second modification of the object detection apparatus 1 is described below.

3-1. Configuration and Process According to Second Modification (Object Detection Apparatus 1B)

Next, an object detection apparatus 1B according to the second modification of the embodiment is described. In FIG. 1, the object detection apparatus 1B is different from the object detection apparatus 1 in that not the program 137 but a program 137B is stored in the program memory 131. In the object detection apparatus 1B, similar elements to those in the object detection apparatus 1 are denoted by similar reference symbols, and a further description thereof is omitted.

Figure 6:
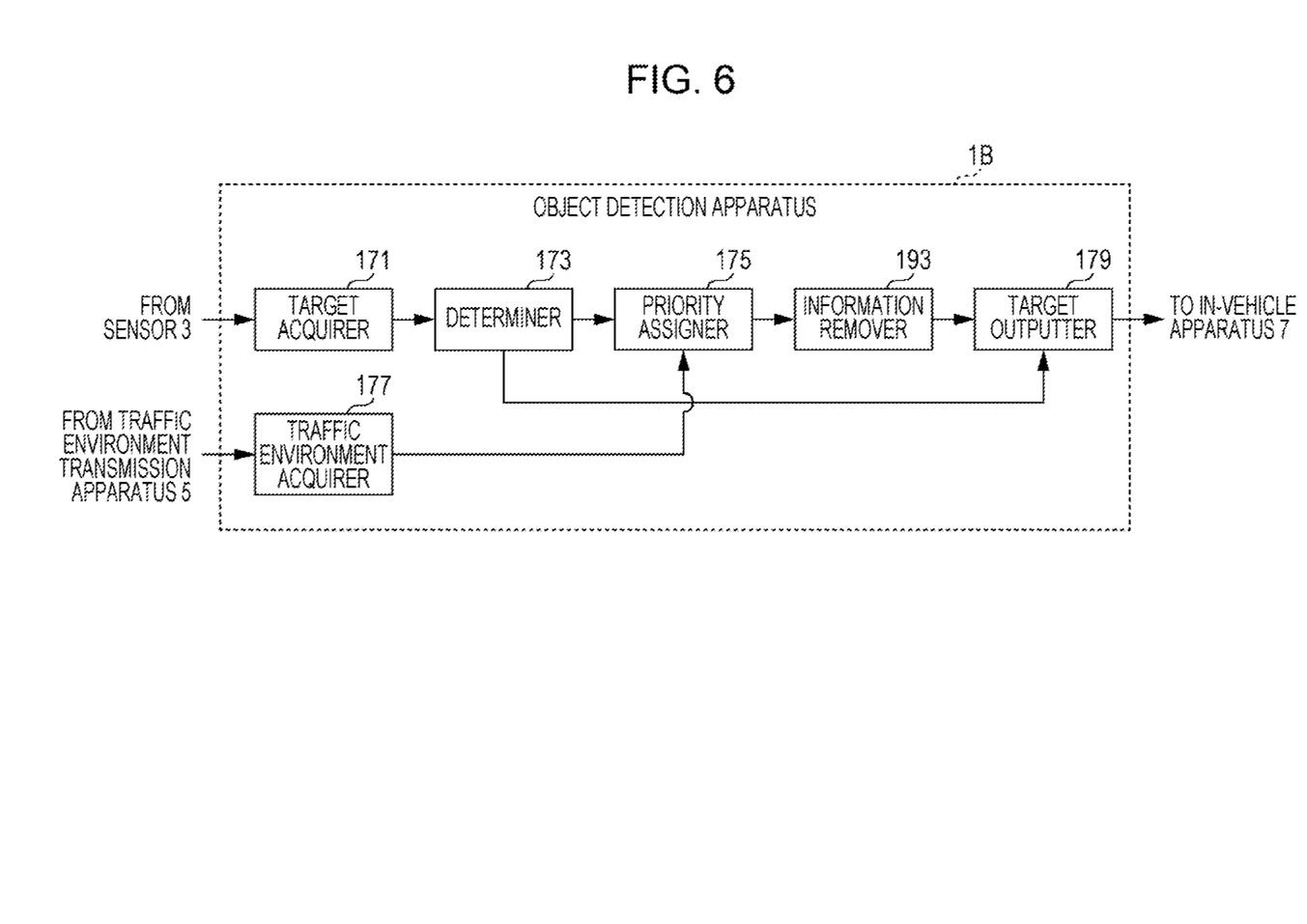
FIG. 6 illustrates functional blocks of an object detection apparatus according to a second modification.
Figure 7:
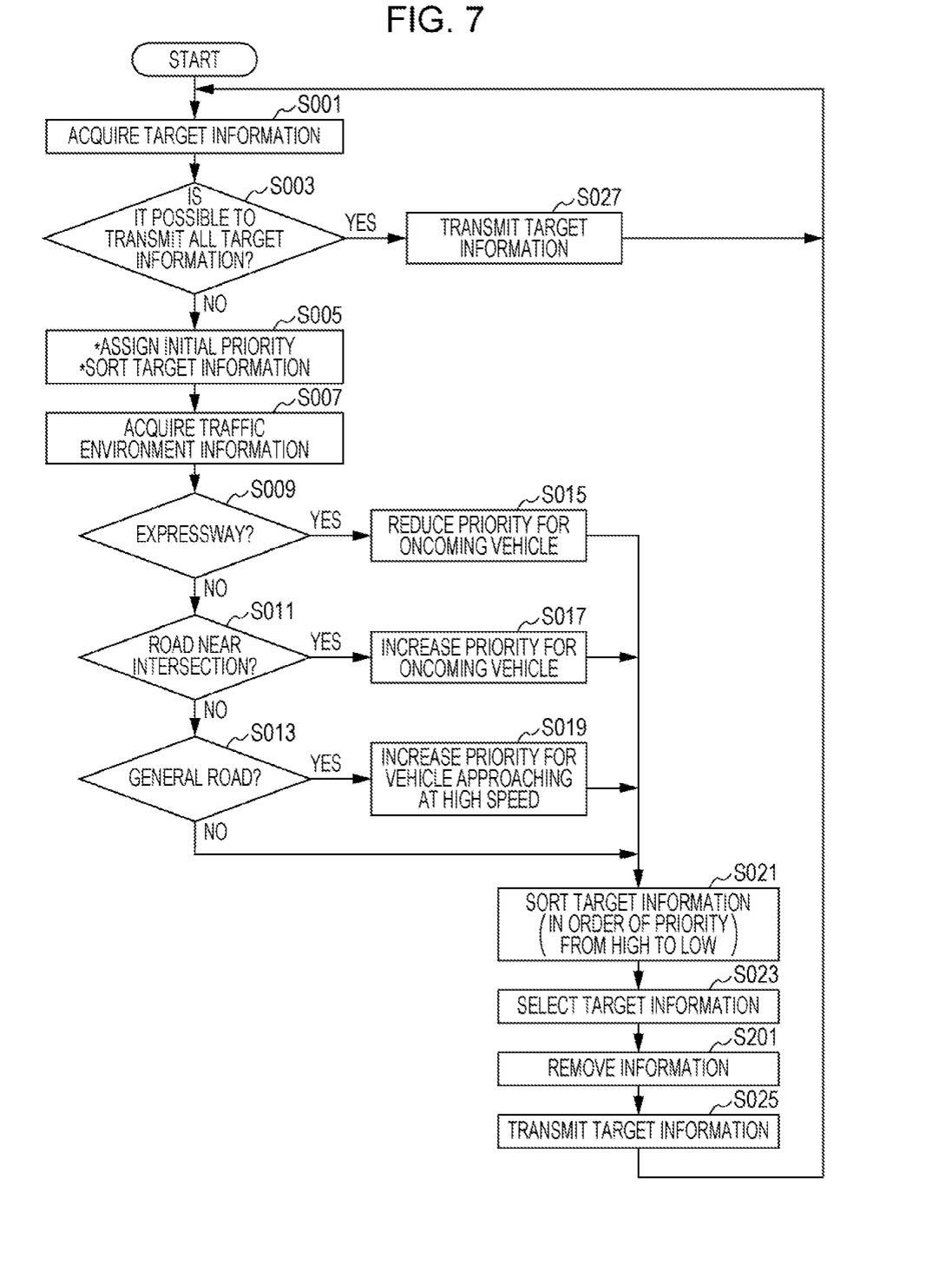
FIG. 7 illustrates a flow of a process performed by the object detection apparatus shown in FIG. 6.

In the control unit 13, the microcomputer 135 executes the program 137B thereby functioning as an information remover 193 in addition to the functional blocks 171 to 179 described above, as shown in FIG. 6. Next, referring to FIG. 7, a processing procedure defined in the program 137B and performed by the microcomputer 135 is described in detail below. The processing flow shown in FIG. 7 is different from that shown in FIG. 3 in that the processing flow additionally includes steps S201. In FIG. 7, similar steps to those in FIG. 3 are denoted by similar step numbers, and a further description thereof is omitted or given in a simplified manner.

After steps S001 to S023, the microcomputer 135 functions as the information remover 193 (step S201). In the second modification, first, the information remover 193 classifies the pieces of information selected in step S023 from the target information T such that pieces of information being high in priority are classified in a first group. The number of pieces of information in the target information T classified in the first group may be properly determined when the object detection apparatus 1B is designed or developed. The information remover 193 further classifies pieces of information in the target information T such that pieces of information that are selected in step S023 but that are not classified in the first group and pieces of information remaining in the target information T without being selected in step S023 are classified in a second group.

The microcomputer 135 further functions as the information remover 193 and removes predetermined items from the pieces of information in the target information T classified in the second group. For example, to identify the location of an object, a distance and a direction described in target information T have a high relativity, but a relative speed and a signal strength do not have a high relativity. Therefore, the microcomputer 135 removes the relative speed and the signal strength from each piece of information in the target information T classified in the second group. As a result, the number of items included in the pieces of information in the target information T classified in the first group becomes larger than the number of items included in the pieces of information in the target information T belonging to the second group.

Next, the microcomputer 135 functions as the target outputter 179 and transmits the pieces of information in the target information T selected in step S023 sequentially, for example, in order of priority from high to low, to the data transmission line 9 via the output port 15 (step S025). In this process, as for the pieces of information in the target information T classified in the first group, all items thereof are transmitted. On the other hand, as for the pieces of information in the target information T in the second group (that is, information in terms of the distance and the direction), the microcomputer 135 transmits as many pieces as allowed by the data output rate and the output time.

3-2. Operations and Effects of Object Detection Apparatus 1B

According to the second modification, the predetermined items are removed from the pieces of information in the target information T in the second group, and thus the object detection apparatus 1B is capable of transmitting a larger number of pieces of information in the target information T to the in-vehicle apparatus 7 although the number of items is reduced. Thus, it is possible to reduce the number of objects that are not transmitted although they are detected by the sensor 3.

3-3. Other Methods of Classifying Information

In the example described above, the object detection apparatus 1B removes information on the relative speed and the signal strength from the pieces of information in the target information T classified in the second group. However, the items removed by the information remover 193 are not limited to these. For example, the information remover 193 may change one or more items removed from the pieces of information in the target information T classified in the second group depending on the traffic environment information E acquired in step S007. More specifically, on expressways, objects located in the surroundings of the vehicle V can be supposed to be vehicles. Therefore, in a case where the answer to step S009 is Yes, then in step S201, information on the signal strength is removed from the pieces of information in the target information T belong to the second group. After step S011 or in a case where the answer to step S013 is Yes, information on the signal strength and the relative speed is removed from the pieces of information in the target information T classified in the second group.

In a still alternative example, the information remover 193 may divide the pieces of information in the target information T belonging to the second group into n subgroups (1st to nth subgroups), and may output information in the target information T belong to each subgroup to the in-vehicle apparatus 7 at a low rate. More specifically, in step S025 in 1st to nth iterations, pieces of information in the target information T respectively belonging to the 1st to nth subgroups are sequentially output on a subgroup-by-subgroup basis. By performing the process in the above-described manner, it is also possible to prevent the target information T detected by the sensor 3 from being missed.

Figure 4:
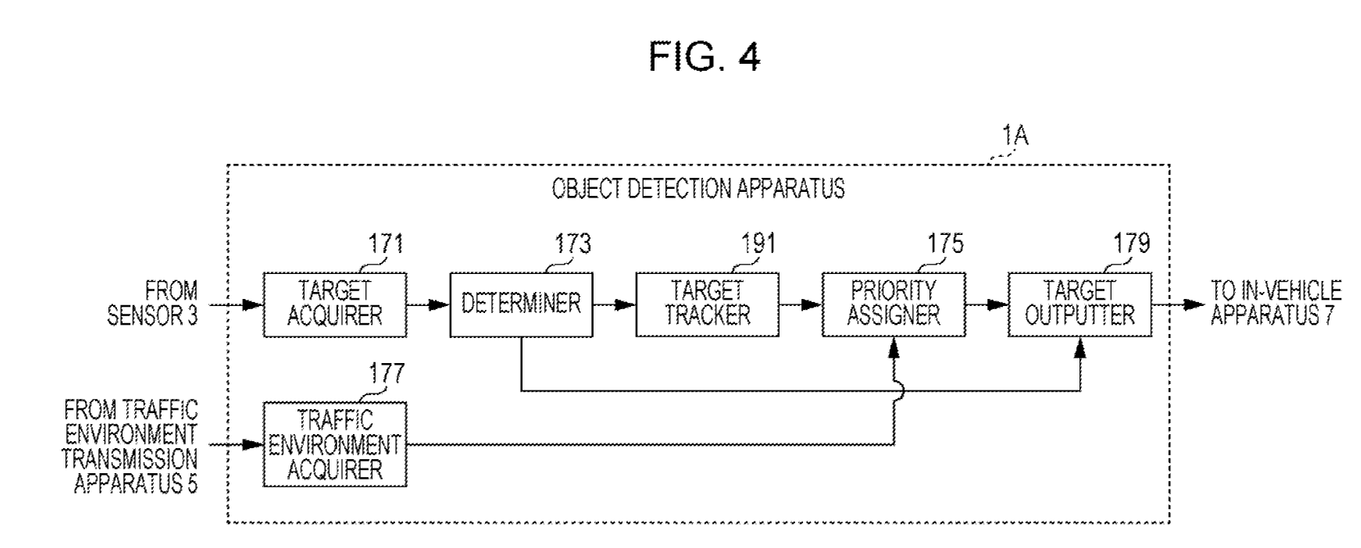
FIG. 4 illustrates functional blocks of an object detection apparatus according to a first modification.
Figure 5:
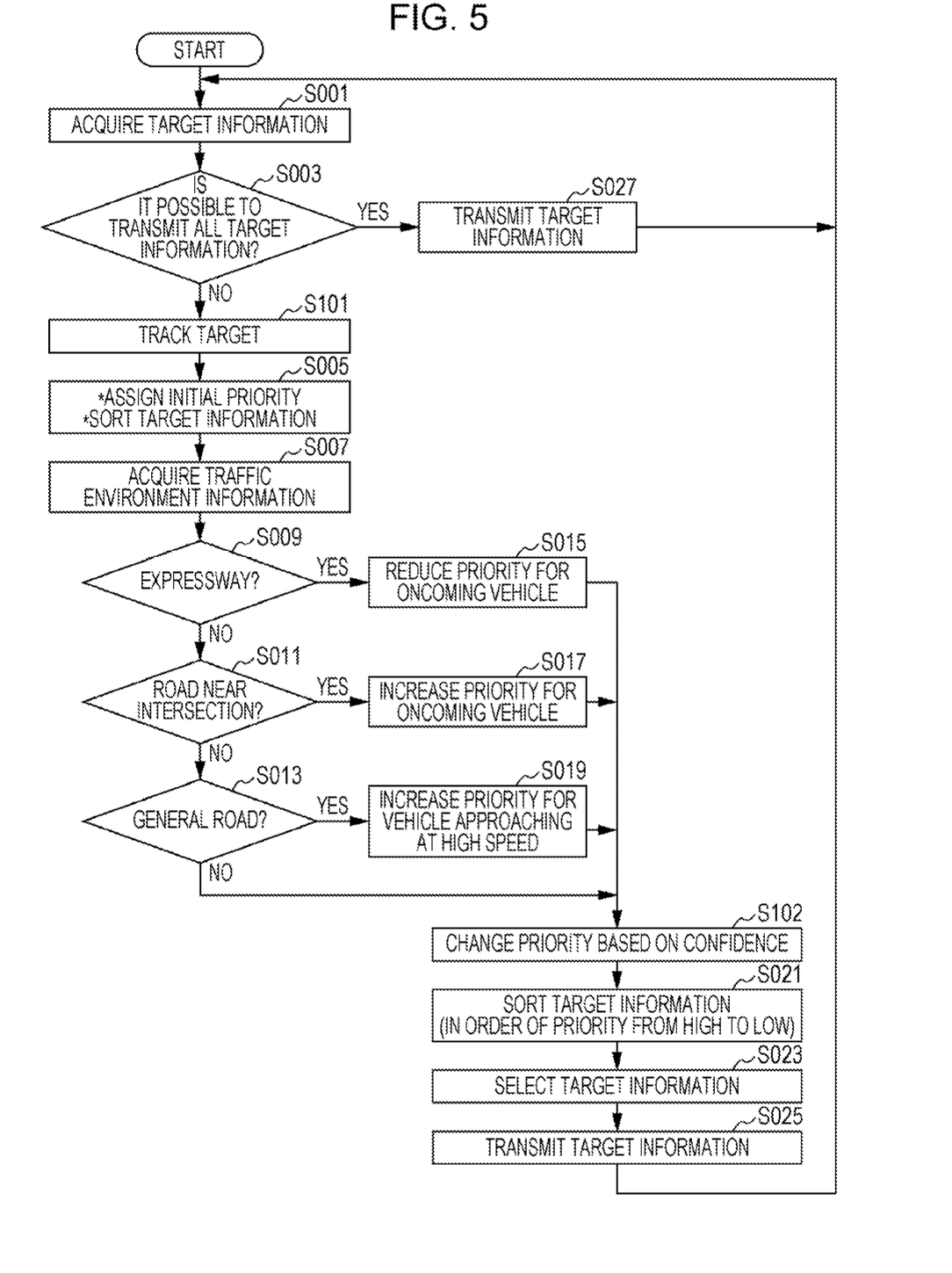
FIG. 5 illustrates a flow of a process performed by the object detection apparatus shown in FIG. 4.

In a still alternative example, in a case where the object detection apparatus 1B includes the target tracker 191 shown in FIG. 4, if the target tracker 191 is capable of successfully tracking the same object in a time series of target information T, the information remover 193 may transmit information such that, of the pieces of information in the current target information T associated with the objects being successfully tracked, items whose values have changed from past values are transmitted regardless of whether the information is in the first group or the second group, and the information remover 193 may remove items whose values have not changed. In a still alternative example, as for the second group, items in the current target information T associated with objects being successfully tracked may be removed if no change from the values described in the past target information T is observed.

3-4. Supplement on Second Modification

In the second modification described above, from the point of view of reducing the number of objects that are not transmitted although they are detected by the sensor 3, the information remover 193 classifies the pieces of information selected in step S023 from the target information T such that pieces of information being high in priority are classified in a first group, and the information remover 193 further classifies pieces of information in the target information T such that pieces of information that are selected in step S023 but that are not classified in the first group and pieces of information remaining in the target information T without being selected in step S023 are classified in a second group. However, alternatively, the information remover 193 may classify the pieces of information selected in step S023 from the target information T such that pieces of information being high in priority are classified in a first group, and pieces of information that are selected in step S023 from the target information T but that are not classified in the first group are classified in the second group. The makes it possible to reduce the transmission bandwidth of the data transmission line 9 used by the object detection apparatus 1B.

4. Notes

The embodiments and modifications described above are merely examples of implementations of the present disclosure, and it is to be understood that these examples do not limit the technical scope of the present disclosure. That is, it is possible to realize the present disclosure in various forms without departing from the scope or the main features of the present disclosure.

The present disclosure can be realized by software, hardware, or software in cooperation with hardware.

Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The object detection apparatus according to the present disclosure is capable of detecting a moving object with enhanced reliability and stability, and the object detection apparatus may be applied to a navigation apparatus, an automatic driving control apparatus, or the like.

What is claimed is:

1. An object detection apparatus comprising:
an input port, which, in operation, receives information on a plurality of objects in surroundings of a vehicle and information on a traffic environment of the vehicle,
the information on the plurality of objects including at least one of direction information, distance information, or relative speed information of the plurality of objects with reference to the vehicle,
the plurality of objects being detected by a sensor installed on the vehicle;
a controller, which, in operation,
determines whether or not a total size of the information on the plurality of objects is greater than a predetermined value in order to determine whether the information on the plurality of objects is able to be transmitted to an in-vehicle apparatus that controls the vehicle, and, in response to the total size of the information on the plurality of objects being greater than the predetermined value, assigns, based on the information on the plurality of objects and the information on the traffic environment, a priority to each of the plurality of objects, and selects pieces of information from the information on the plurality of objects based on the priority for each of the plurality of objects; and an output port, which, in operation, outputs the selected pieces of information to the in-vehicle apparatus, wherein information on each object detected by the sensor includes a plurality of items associated with the object, wherein the output port, in operation, outputs, to the in-vehicle apparatus, information on the plurality of objects belonging to a first information group and information on the plurality of objects belonging to a second information group that is lower in priority than the first information group, the first information group and the second information group being included in the selected pieces of information, and wherein a number of items included in the first information group is larger than a number of items included in the second information group.

2. The object detection apparatus according to claim 1, wherein the information on the traffic environment is received from at least one of a navigation apparatus used in the vehicle, a traffic environment recognition apparatus installed on a road on which the vehicle runs, or the sensor.

3. The object detection apparatus according to claim 1, wherein the in-vehicle apparatus is at least one of a device that controls running of the vehicle or a device that controls one or more contents displayed on a display apparatus used in the vehicle.

4. The object detection apparatus according to claim 1, wherein the output port outputs the selected pieces of information to the in-vehicle apparatus sequentially in order of priority from high to low.

5. The object detection apparatus according to claim 1, wherein the controller, in operation, removes one or more items from the second information group based on the information on the traffic environment.

6. The object detection apparatus according to claim 1, wherein a frequency of outputting the second information group is lower than a frequency of outputting the first information group.

7. The object detection apparatus according to claim 1, wherein the input port receives the information on the plurality of objects time-sequentially, wherein the controller, in operation, attempts to repeatedly perform a target tracking process on the plurality of objects based on the information on the plurality of objects, and wherein the controller, in operation, determines the priority for each of the plurality of objects based on the information on the plurality of objects, the information on the traffic environment, and a result of the target tracking process.

8. The object detection apparatus according to claim 7, comprising a memory, wherein the controller, in operation, repeatedly detects second information on a first object selected by the target tracking process on the plurality of objects, and repeatedly stores the second information in the memory, the second information including a plurality of second items associated with the first object.

9. The object detection apparatus according to claim 8, wherein the controller, in operation, detects, by comparing the detected second information with the stored second information, one or more differential second items among the plurality of second items, and wherein the output port, in operation, outputs the one or more differential second items to the in-vehicle apparatus.

10. The object detection apparatus according to claim 7, comprising a memory, wherein the controller, in operation, repeatedly detects second information on a first object among the second information group selected by the target tracking process on the plurality of objects, and repeatedly stores the second information in the memory, the second information including a plurality of second items associated with the first object, wherein the controller, in operation, detects, by comparing the second information with the stored second information, one or more differential second items among the plurality of second items, and wherein the output port, in operation, outputs the one or more differential second items to the in-vehicle apparatus.

11. The object detection apparatus according to claim 1, wherein the information on the traffic environment includes at least one of information indicating a type of a road on which the vehicle is travelling, information indicating a building adjacent to the road on which the vehicle is travelling, or information indicating a current weather condition.

12. An object detection apparatus comprising:

an input port, which, in operation, receives information on a plurality of objects in surroundings of a vehicle and information on a traffic environment of the vehicle, the information on the plurality of objects including at least one of direction information, distance information, or relative speed information of the plurality of objects with reference to the vehicle, the plurality of objects being detected by a sensor installed on the vehicle;

a controller, which, in operation, determines whether or not a total size of the information on the plurality of objects is greater than a predetermined value in order to determine whether the information on the plurality of objects is able to be transmitted to an in-vehicle apparatus that controls the vehicle, and, in response to the total size of the information on the plurality of objects being greater than the predetermined value, assigns, based on the information on the plurality of objects and the information on the traffic environment, a priority to each of the plurality of objects, and selects pieces of information from the information on the plurality of objects based on the priority for each of the plurality of objects; and an output port, which, in operation, outputs the selected pieces of information to the in-vehicle apparatus, wherein the output port, in operation, outputs, to the in-vehicle apparatus, information on the plurality of objects belonging to a first information group and information on the plurality of objects belonging to a second information group that is lower in priority than the first information group, the first information group and the second information group being included in the selected pieces of information, and wherein a frequency of outputting the second information group is lower than a frequency of outputting the first information group.

13. An object detection apparatus comprising:

a memory;

an input port, which, in operation, receives information on a plurality of objects in surroundings of a vehicle and information on a traffic environment of the vehicle, the information on the plurality of objects including at least one of direction information, distance information, or relative speed information of the plurality of objects with reference to the vehicle, the plurality of objects being detected by a sensor installed on the vehicle;

a controller, which, in operation, determines whether or not a total size of the information on the plurality of objects is greater than a predetermined value in order to determine whether the information on the plurality of objects is able to be transmitted to an in-vehicle apparatus that controls the vehicle, and, in response to the total size of the information on the plurality of objects being greater than the predetermined value, assigns, based on the information on the plurality of objects and the information on the traffic environment, a priority to each of the plurality of objects, and selects pieces of information from the information on the plurality of objects based on the priority for each of the plurality of objects; and an output port, which, in operation, outputs the selected pieces of information to the in-vehicle apparatus, wherein the input port receives the information on the plurality of objects time-sequentially, wherein the controller, in operation, attempts to repeatedly perform a target tracking process on the plurality of objects based on the information on the plurality of objects, determines the priority for each of the plurality of objects based on the information on the plurality of objects, the information on the traffic environment, and a result of the target tracking process, repeatedly detects information on a first object selected by the target tracking process, the information on the first object including a plurality of items associated with the first object, repeatedly stores the information on the first object in the memory, detects, by comparing the detected information on the first object with the stored information on the first object, one or more differential items among the plurality of items, and wherein the output port, in operation, outputs the one or more differential items to the in-vehicle apparatus.

14. An object detection apparatus comprising:

a memory;

an input port, which, in operation, receives information on a plurality of objects in surroundings of a vehicle and information on a traffic environment of the vehicle, the information on the plurality of objects including at least one of direction information, distance information, or relative speed information of the plurality of objects with reference to the vehicle, the plurality of objects being detected by a sensor installed on the vehicle;

a controller, which, in operation, determines whether or not a total size of the information on the plurality of objects is greater than a predetermined value in order to determine whether the information on the plurality of objects is able to be transmitted to an in-vehicle apparatus that controls the vehicle, and, in response to the total size of the information on the plurality of objects being greater than the predetermined value, assigns, based on the information on the plurality of objects and the information on the traffic environment, a priority to each of the plurality of objects, and selects pieces of information from the information on the plurality of objects based on the priority for each of the plurality of objects; and an output port, which, in operation, outputs the selected pieces of information to the in-vehicle apparatus, wherein the input port receives the information on the plurality of objects time-sequentially, wherein the controller, in operation, attempts to repeatedly perform a target tracking process on the plurality of objects based on the information on the plurality of objects, and determines the priority for each of the plurality of objects based on the information on the plurality of objects, the information on the traffic environment, and a result of the target tracking process, wherein the output port, in operation, outputs, to the in-vehicle apparatus, information on the plurality of objects belonging to a first information group and information on the plurality of objects belonging to a second information group that is lower in priority than the first information group, the first information group and the second information group being included in the selected pieces of information, wherein the controller, in operation, repeatedly detects information on a first object among the second information group and selected by the target tracking process, the information on the first object including a plurality of items associated with the first object, repeatedly stores the information on the first object in the memory, detects, by comparing the detected information on the first object with the stored information on the first object, one or more differential items among the plurality of items, and wherein the output port, in operation, outputs the one or more differential second items to the in-vehicle apparatus.

* * * * *